Aug. 26, 1952   J. P. BLEWETT   2,608,683
PHASE COMPARISON OBJECT LOCATING SYSTEM
Original Filed Oct. 28, 1943   2 SHEETS—SHEET 1

Inventor:
John P. Blewett,
by Merton W. Moore
His Attorney.

Inventor:
John P. Blewett,
by Morton D Morse
His Attorney.

Patented Aug. 26, 1952

2,608,683

UNITED STATES PATENT OFFICE 2,608,683

PHASE COMPARISON OBJECT LOCATING SYSTEM

John P. Blewett, Schenectady, N. Y., assignor to General Electric Company, a corporation of New York Original application October 28, 1943, Serial No. 508,024, now Patent No. 2,467,361, dated April 12, 1949. Divided and this application December 29, 1945, Serial No. 638,381

5 Claims. (Cl. 343—11)

The present invention relates to radio locating equipment utilizing the comparison of echoes arriving at spaced receiving antennas to determine the direction of the reflecting object.

This application is a division of my application, Serial No. 508,024, filed October 28, 1943, now Patent 2,467,361, issued April 12, 1949, and assigned to the assignee of this application.

An object of my invention is to provide improved echo comparison circuits and equipment for utilizing the circuits to increase the rate at which information can be obtained.

Figure 1:
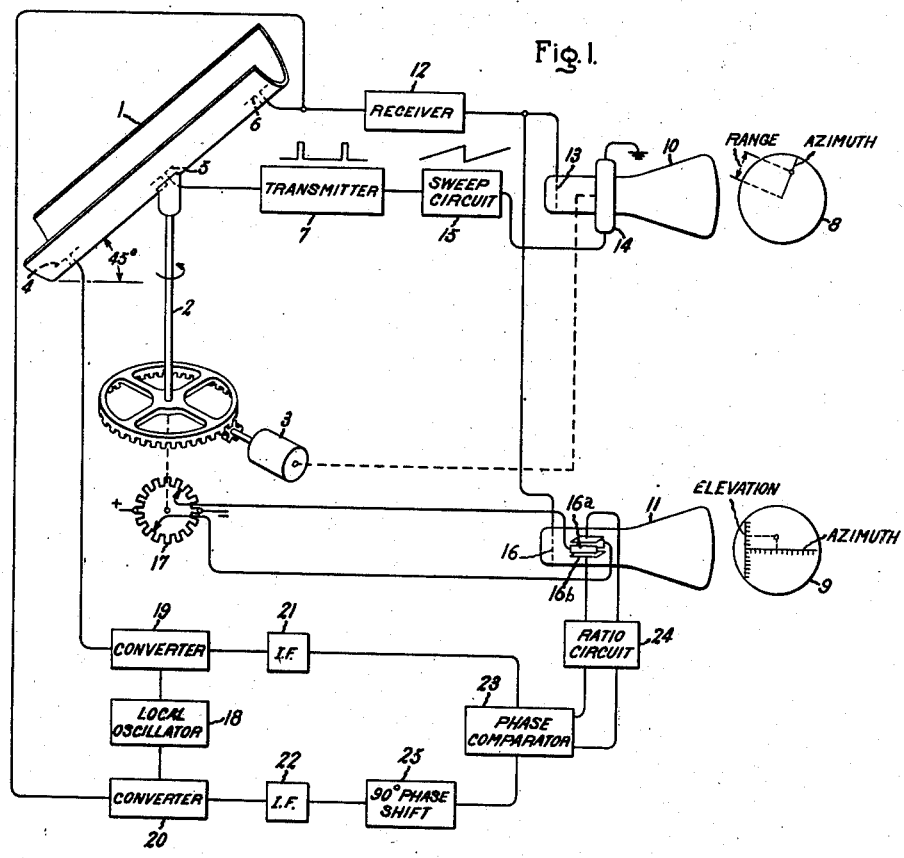
Figure 2:
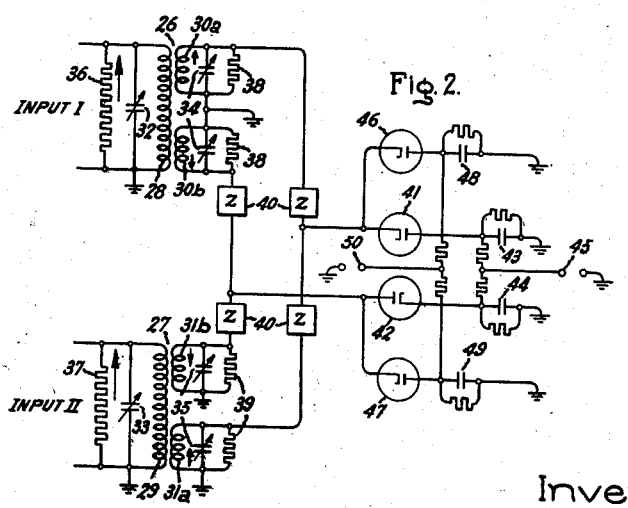
Figure 3:
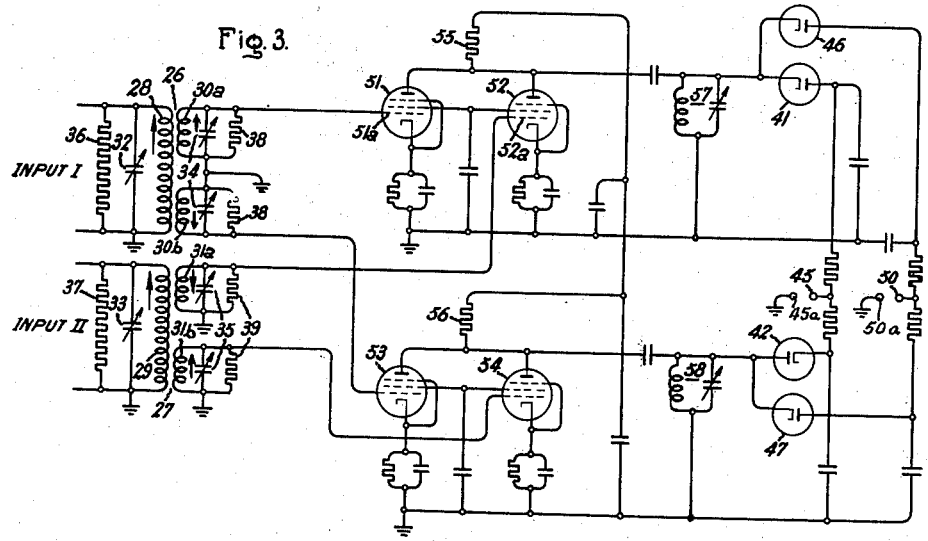
Figure 4:
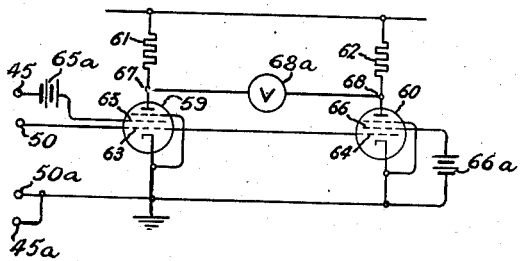
Figure 5:
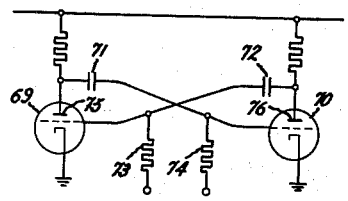

The novel features which I believe to be characteristic of my invention are set forth with particularity in the appended claims. My invention itself, however, both as to its organization and method of operation, together with further objects and advantages thereof, may best be understood by reference to the following description taken in connection with the accompanying drawings in which Fig. 1 is a diagram of locating equipment embodying my invention; Figs. 2 and 3 are diagrams of phase comparators, and Figs. 4 and 5 are diagrams of ratio circuits.

Referring to Fig. 1 of the drawings there is shown a parabolic cylinder reflector 1 fixed at an angle of 45° to a vertical pedestal 2 rotated by a motor 3. Spaced apart along the focal line of the reflector are antennas 4, 5, and 6, the antenna 5 at the center being connected to a pulse transmitter 7 so as to transmit periodic pulses of radio waves each being directed by the reflector in a fan-shaped beam having a width approximately 90°.

During the intervals between the transmitted pulses, echoes or reflections from objects located in the path of the transmitted waves arrive at the antennas 4 and 6 at times dependent upon the range of the reflecting objects and with a relative phase dependent upon the angular direction of the reflecting objects with respect to the orientation of the antenna system. Since the receiving antennas 4 and 6 are correspondingly oriented within the common reflector 1, their planes of maximum directivity are coincident with each other and with the plane of symmetry of the reflector 1. Therefore, the phase relation between the pulse voltages received at the antennas 4 and 6 from a given reflecting object is a direct function of the angular displacement of that object from the direction of maximum intensity of the receiving antennas, i. e., a line or axis in said plane at right angles to the longitudinal axis of said reflector and located midway between said receiving antennas. For ground equipment with this line, which may be called the center line of the plane of the beam, at an elevation of 45°, reflections are received from objects at elevations of from 0° to 90° so that the whole sky is scanned during each rotation of the pedestal. The use of phase comparison to determine the elevation of the reflecting objects increases the rate at which information can be obtained.

In the illustrated equipment, the information is presented on the viewing screens 8 and 9 of cathode ray tubes 10, 11, azimuth and range being presented on the viewing screen 8 and azimuth and elevation being presented on the viewing screen 9.

The map-like presentation on the viewing screen 8 is obtained from the signal picked up by antenna 6, which is fed through a receiver 12 to the grid 13 of the cathode ray tube 10. Around the throat of the cathode ray tube is a deflection coil 14 fed by a saw-tooth sweep circuit 15 keyed by the transmitter so as to have a current increasing linearly from a minimum at the end of each transmitted pulse to a maximum immediately prior to a succeeding pulse. The current flowing in the coil 14 causes a radial deflection of the beam of the cathode ray tube starting at the center with each transmitted pulse.

The coil 14 is rotated by the motor 3 synchronously with the pedestal 2 so the deflecting axis corresponds to the azimuth of the fan-shaped beam transmitted from the antenna 5. The radial trace on the viewing screen of the cathode ray tube corresponds to the azimuth of the reflecting objects and the modulation of the trace by the echoes produces spots at a distance from the center viewing screen corresponding to the range of the objects.

The azimuth and elevation of the reflecting objects, presented on the viewing screen 9, are obtained by applying the echo signal from receiver 12 to the grid 16 to modulate the beam of the cathode ray tube 11. The beam is deflected horizontally in accordance with the azimuth of the reflecting objects by horizontal deflection plates 16a excited from a potentiometer 17 rotated synchronously with the pedestal 2. The beam is deflected vertically in accordance with the elevation of the reflection of objects by vertical deflection plates 16b excited from circuits hereinafter described, by voltages dependent upon the relative phase of echoes arriving at the antennas 4 and 6.

In the phase comparison circuits, the echo signals from the antennas 4 and 6 are heterodyned against a common local oscillator 18 in converters 19 and 20 to produce an intermediate frequency of 30 megacycles. Because of the heterodyning against a common local oscillator, the phase difference between the echo signals is preserved at the intermediate frequency. The output of IF amplifiers 21 and 22 is fed through a phase comparator 23 and a ratio circuit 24, both hereinafter described, to the deflection plates 17. In accordance with usual practice in phase comparison, a 90° phase shift, indicated at 25, is effected in the relative phase of the voltages prior to the phase comparison. The purpose of the ratio circuit is to make the phase determination independent of variations in the magnitudes of the voltages fed to the phase comparator. This takes care of both the effects of fading which causes both voltages to fluctuate in unison, and of unbalance in the receiving channels, which affects one voltage more than the other.

In the phase comparator shown in Fig. 2, the output of the IF amplifiers 21 and 22 is fed to input transformers 26 and 27 having grounded primary windings 28 and 29 and grounded secondary windings 30a, 30b and 31a, 31b. Both the primary and secondary circuits are tuned by shunt condensers 32, 33, 34, 35 to the frequency of the voltages to be compared (30 megacycles) and are loaded by shunt resistances 36, 37, 38, 39 to pass a band of about 2 megacycles. This permits the comparison of pulse voltages such as the echoes from remote objects.

The secondaries 30a, 31a and 30b, 31b are connected in series, with the instantaneous voltages respectively bucking and aiding as indicated by the voltage arrows on the drawing, by pairs of decoupling impedances 40. At the mid-point of each pair of impedances appear respectively the voltages proportional to the difference and sum of the transformer input voltages. The sum and difference voltages are fed through square law detectors, such as diodes 41 and 42. The diodes are connected in reverse polarity to ground through condensers 43, 44 which accordingly are charged to voltages of opposite polarity—each proportional to the square of the sum or the difference voltage. The voltage between terminal 45 and ground is proportional to the product of the magnitudes of the two voltages to be compared and the sine of the phase displacement between the voltages plus some higher order terms which are negligible if the phase displacement is small. These higher order terms are due to the variation of the detectors 41 and 42 from a true square law.

By using another pair of diodes 46 and 47, with the same polarity with respect to each other, connected to ground through condensers 48 and 49, the condensers are charged to the square of the respective sum and difference voltages. At terminal 50 appears a voltage proportional to the sum of the squares of the magnitudes of the voltages to be compared, plus some negligible higher order terms. If E1 and E2 are the magnitudes of the voltages to be compared and $\theta$ is the phase difference between the voltages $$\frac{\text{Voltage at terminal 45}}{\text{Voltage at terminal 50}} =$$

$$\frac{[E_1 \sin \omega t + E_2 \cos (\omega t + \theta)]^2 - [E_1 \sin \omega t - E_2 \cos (\omega t + \theta)]^2}{[E_1 \sin \omega t + E_2 \cos (\omega t + \theta)]^2 + [E_1 \sin \omega t - E_2 \cos (\omega t + \theta)]^2} = \frac{-2E_1E_2 \sin \theta + 2E_1E_2 \sin (2\omega t + \theta)}{E_1^2 + E_2^2 - E_1^2 \cos 2\omega t + E_2^2 \cos 2(\omega t + \theta)}$$

Since the terms of this equation which include $\omega t$ are for radio frequency components and since these components do not appear across capacitors 43, 44, 48 and 49, they may be disregarded, and the equation becomes $$\frac{\text{Voltage at terminal 45}}{\text{Voltage at terminal 50}} = \frac{2E_1E_2 \sin \theta}{E_1^2 + E_2^2}$$

In the apparatus shown, E1 will be very nearly equal to E2, and no substantial error arises if the equation is rewritten as $$\frac{\text{Voltage at terminal 45}}{\text{Voltage at terminal 50}} = \frac{2E_1E_2 \sin \theta}{2E_1E_2} = \sin \theta \quad (1)$$

One of the advantages of the phase comparison circuit of Fig. 2 is that the input and output circuits can be grounded without introducing errors due to stray capacities. This is particularly important in phase comparison at high frequencies. The grounding is made possible by the connection of each of the pairs of secondaries 30a, 31a and 30b, 31b in a bridge circuit with one of the pairs of impedances 40.

In Fig. 3 is a modification of the phase comparison circuit of Fig. 2 in which pentodes 51, 52, 53, 54 have been substituted for the impedances 40 in the bridge circuits between the transformers 26 and 27 and the diodes 41, 42, 46, 47. The instantaneous potentials with respect to ground across the secondary windings 30a, 30b, 31a, and 31b are the same as those indicated at Fig. 2 and have been similarly indicated by voltage arrows on Fig. 3 of the drawing. The secondaries 30a and 31a are connected respectively to the grids 51a and 52a and an amplified output voltage proportional to the sum of the voltages to be compared appears across resistance 55. The secondaries 30b and 31b are connected to the control grids of pentodes 53 and 54 and an amplified output voltage proportional to the difference of the voltages to be compared appears across resistance 56. The amplifier output voltages, as in the Fig. 2 circuit, are fed through the diode detectors 41, 42 to obtain a voltage at terminal 45 proportional to the product of the voltages to be compared by the sine of the phase angle between the voltages. Similarly, from diode detectors 46 and 47 a voltage is obtained at terminal 50 proportional to the sum of the squares of the voltages to be compared. Resonant circuits 57 and 58, which include the diode capacity, increase the proportion of the signal appearing across the diodes.

The amplifiers 51, 52, 53, 54 isolate the detector circuits from the input circuits and also permit the regaining of the signal strength sacrificed in the bridge circuits which permit grounding of both the input and measuring circuits.

It is obvious that unbalance in the circuits will cause inaccuracy. For example, the amplifier tubes 51, 52, 53, 54 should have equal amplification; equal voltages should be induced in the secondaries 30a, 30b, and 31a, 31b, and, for equal input voltages, all of the secondary voltages should be equal; and the resonant circuits at the transformer windings and at the detector input should be tuned to the same frequency.

Where first and second comparator circuits are referred to elsewhere herein, it should be understood that the first comparator circuit includes the circuit elements and components necessary to provide the voltage at terminal 45 proportional to the product of the voltages to be compared and the sine of the phase angle between the voltages, while the second comparator circuit includes the circuit elements and components necessary to provide the voltage at terminal 50 proportional to the sum of the squares of the voltages to be compared. In the embodiments of the invention illustrated and described herein, the first comparator circuit includes detectors 41 and 42 and other circuit components associated with these devices and connecting them to the two receiving antennas. Similarly, the second comparator circuit in the embodiments illustrated and described herein includes detectors 46 and 47 and other circuit components associated with these devices and connecting them to the two receiving antennas.

To obviate the necessity of separately measuring the voltages at terminals 45 and 50, ratio circuits shown in Figs. 4 and 5 may be used to obtain a direct measurement of the quotients of the terminal voltages.

The ratio circuit of Fig. 4 utilizes the characteristics of remote cut-off tubes which over a limited range have an output directly proportional to screen grid voltage and inversely proportional to negative control grid voltage. By using tubes in parallel, this limited range can be extended or made more accurate. The principles are illustrated in Fig. 4 where identical remote cut-off tubes 59 and 60 (e. g. 6SK7) are connected in parallel through identical resistances 61 and 62. When used in conjunction with the phase comparison circuits of Figs. 2, 3, the control grids 63 and 64 are supplied with a negative direct current voltage equal to $E_1^2+E_2^2$. This voltage appears on terminal 50 of Fig. 3, and terminal 50 of Fig. 3 may be considered connected directly to terminal 50 of Fig. 4. The grounded terminals 50a and 45a of Fig. 3 may be considered as directly connected to similarly numbered terminals of Fig. 4. The screen grid 66 is supplied with a fixed positive bias potential $E_0$, as from a source 66a, and the screen grid 65 is supplied with the sum of $E_0$ from source 65a and $2E_1E_2$ sine $\theta$ by a connection from terminal 45 of Fig. 3 to terminal 45 of Fig. 4. The output voltages across resistances 61 and 62 are then each proportional to the quotient of the respective screen grid voltage divided by the control grid voltage, and a voltmeter 68a connected between points 67 and 68 will continuously indicate the solution of Equation 1. It is obvious that the ratio circuit may be used for other voltages. It will handle D.-C. or pulsed voltages and positive and negative ratios. By the use of the ratio circuit, the measurement of phase angle can be made substantially independent of fading or other factors causing fluctuations in magnitude of the voltages to be compared in phase.

The ratio circuit of Fig. 5 which utilizes the characteristics of multivibrators, will handle ratios of D.-C. voltages. This circuit can be operated to indicate the ratio either by the percentage of time one of the multivibrator tubes is conducting or by the output frequency.

The circuit is the conventional multivibrator with identical triodes 69 and 70, condensers 71 and 72, and grid resistances 73 and 74.

In the first mode of operation, in which the ratio is measured by the percentage of time one of the tubes is conducting, one of the voltages to be compared ($V_1$) is applied to the grid resistance 74 and the other voltage ($V_2$) minus the first voltage is applied to the grid resistance 73. where $V_1$ and $V_2$ are positive unidirectional voltages. Where the ratio circuit is used with a phase comparator such as shown at Fig. 2 or 3, the voltages $V_1$ and $V_2$ are the voltages appearing at the terminals 45 and 50. An ammeter in series with the tube 69 will indicate the ratio of the first voltage to the other voltage. This is based upon the fact that, with identical tubes and RC grid circuits, the time each tube is cut off is inversely proportional to the grid voltage.

If $V_1$ and $V_2$ are the voltages to be compared, the percentage of time the tube 69 is conducting will be given by the following equation.

$$\frac{\frac{1}{V_2-V_1}}{\frac{1}{V_2-V_1}+\frac{1}{V_1}}=\frac{V_1}{V_2} \qquad (2)$$

In the second mode of operation in which the ratio of the voltages is measured by the output frequency of the multivibrator, use is made of the fact that with a multivibrator having a positive grid bias the output frequency is linearly proportional to the ratio of the grid voltage to the plate voltage. If $V_1$ is applied to the grid resistances 73 and 74 and $V_2$ is applied to the anodes 75 and 76, the output frequency will be proportional to the ratio $V_1:V_2$.

Certain features of the ratio circuits per se are claimed in my copending application Serial No. 638,382, filed December 29, 1945, now Patent 2,553,294, issued May 15, 1951, which is likewise a division of my application Serial No. 508,024, filed October 28, 1943, now Patent 2,467,361.

While I have shown particular embodiments of my invention, it will be understood that many modifications may be made without departing from the spirit thereof, and I contemplate by the appended claims to cover any such modifications as fall within the true spirit and scope of my invention.

What I claim as new and desire to secure by Letters Patent of the United States is:

1. In radio locating equipment, means for transmitting pulses of radio waves toward a remote reflecting object, a pair of directive receiving antennas having a common axis of maximum directivity and adapted to receive echoes from said object, said antennas being spaced apart along an axis transverse to said first axis, whereby the relative phase of echoes received at said antennas is a function of the angle of displacement of said object from said first axis, means comprising a first comparator circuit coupled to both said antennas for developing a first voltage substantially proportional to the product of the magnitudes of said received echoes by the sine of said angle, means comprising a second comparator circuit coupled to both said antennas for developing a second voltage substantially proportional to the sum of the squares of the magnitudes of said echoes, and means for measuring the ratio of said first and second voltages, thereby to produce a resultant voltage substantially proportional to the sine of said angle.

2. In radio locating equipment, an elongated parabolic antenna reflector, means supporting said reflector for rotation about a selected axis with the longitudinal axis of said reflector intersecting said selected axis at an acute angle, a transmitting antenna positioned within said reflector, means for energizing said antenna to radiate radio waves toward a remote reflecting object, a pair of receiving antennas correspondingly positioned within said reflector and spaced apart along said reflector longitudinal axis, said receiving antennas and reflector producing substantially coincident receiving antenna patterns each having maximum directivity in a plane through said longitudinal reflector axis, whereby the relative phase of waves received by said receiving antennas due to echoes from said object is a direct function of the angle of displacement of said object with respect to a line in said plane at right angles to said longitudinal axis, means comprising a phase comparison circuit energized from both said receiving antennas for measuring the relative phase of said waves and means energized from said circuit for indicating said angle of displacement.

3. A radio locating equipment comprising means for transmitting pulses of radio waves toward a remote reflecting object, a pair of directive receiving antennas having a common axis of maximum directivity and adapted to receive echoes from said object, said antennas being spaced apart along an axis at right angles to said first axis, whereby the relative phase of echoes received at said antennas is a function of the angle of displacement of said object from said first axis, means connected to said antennas for obtaining a first voltage substantially proportional to the difference in magnitudes of said echoes, means connected to said antennas for deriving a second voltage substantially proportional to the sum of the magnitudes of said echoes, square law detectors for providing detected voltages responsive to said first and second voltages, and means responsive to the ratio of the detected voltages for producing a voltage responsive to the magnitude of said angle.

4. A radio locating equipment comprising means for transmitting pulses of radio waves toward a remote reflecting object, a pair of directive receiving antennas having a common axis of maximum directivity and adapted to receive echoes from said objects, said antennas being spaced apart along an axis transverse to said first axis, whereby the relative phase of echoes received at said antennas is a function of the angle of displacement of said object from said first axis, means connected to said antennas for obtaining a first voltage proportional to the difference in magnitudes of said echoes, means connected to said antennas for deriving a second voltage proportional to the sum of the magnitudes of said echoes, square law detectors for said first and said second voltages, said detectors providing a third voltage substantially proportional to the product of the magnitudes of said received echoes by the sine of said angle and a fourth voltage substantially proportional to the sum of the squares of the magnitudes of said echoes, and electron discharge device means responsive to the ratio of said third and fourth voltages for producing a resultant voltage substantially proportional to the sine of said angle.

5. A radio locating equipment comprising an elongated parabolic antenna reflector, means supporting said reflector for rotation on a vertical axis with the longitudinal axis of said reflector intersecting said vertical axis at approximately a 45° angle, a transmitting antenna centrally positioned within said reflector, means for energizing said antenna to radiate radio waves toward a remote reflecting object, a pair of receiving antennas positioned within said reflector and spaced apart along said longitudinal reflector axis on opposite sides of and approximately equidistant from said transmitting antenna, said receiving antennas and reflector producing substantially coincident fan-shaped receiving antenna patterns each having maximum directivity in a vertical plane through said longitudinal reflector axis, whereby the relative phase of waves received by said receiving antennas due to echoes from said object is a direct function of the angle of displacement of said object with respect to a line in said plane through said transmitting antenna at right angles to said longitudinal axis, means comprising a first comparator circuit coupled to both said receiving antennas for developing a first voltage substantially proportional to the product of the magnitudes of said received echoes by the sine of said angle, means comprising a second comparator circuit coupled to both said receiving antennas for developing a second voltage substantially proportional to the sum of the squares of the magnitudes of said echoes, and means for measuring the ratio of said first and second voltages, thereby to produce a resultant voltage substantially proportional to the sine of said angle.

JOHN P. BLEWETT.

REFERENCES CITED

The following references are of record in the file of this patent:

UNITED STATES PATENTS

| Number | Name | Date |
|---|---|---|
| 2,042,831 | Crosby | June 2, 1936 |
| 2,166,991 | Guanella | July 25, 1939 |
| 2,208,378 | Luck | July 16, 1940 |
| 2,400,641 | Hardy | May 21, 1946 |
| 2,407,649 | Budenbom | Sept. 17, 1946 |
| 2,415,094 | Hansen | Feb. 4, 1947 |
| 2,416,155 | Chubb | Feb. 18, 1947 |
| 2,418,143 | Stodola | Apr. 1, 1947 |
| 2,427,029 | Stearns | Sept. 9, 1947 |
| 2,433,991 | Hebb | Jan. 6, 1948 |
| 2,480,829 | Barrow | Sept. 6, 1949 |
| 2,510,692 | Goddard | June 6, 1950 |
| 2,523,398 | Southworth | Sept. 26, 1950 |